United States Patent [19]

Cole et al.

[11] 4,178,411
[45] Dec. 11, 1979

[54] FIBRE EXPANDED REINFORCED MATERIALS AND THEIR PROCESS OF MANUFACTURE

[75] Inventors: Ernest A. Cole, Upper Gravenhurst; Frederic N. Cogswell; Jonathan Huxtable, both of Welwyn Garden City, all of England

[73] Assignee: Imperial Chemical Industries, Limited, London, England

[21] Appl. No.: 814,670

[22] Filed: Jul. 11, 1977

[51] Int. Cl.² .............................................. B29D 27/00
[52] U.S. Cl. .................................... 428/310; 106/41; 260/37 EP; 260/37 M; 260/40 R; 260/42.18; 264/41; 264/43; 264/45.3; 264/46.4; 264/176 R; 264/DIG. 5; 264/DIG. 13; 521/79; 521/80
[58] Field of Search ............... 264/41, 45.3, DIG. 17, 264/DIG. 5, DIG. 13, 46.4, 176 R, 43; 428/310; 521/79, 80; 260/37 EP, 37 M, 40 R, 42.18; 106/41

[56] References Cited

U.S. PATENT DOCUMENTS 3,846,523  11/1974  Geerdes ........................ 264/45.3 X

OTHER PUBLICATIONS

Brydson, J. A., "Flow Properties of Polymer Melts," London, Iliffe Books, 1970, pp. 63-69.
Turner, S. and F. N. Cogswell, "Fibre Foam: a Rheological Phenomenon," in the *Proceedings: VIIth International Congress on Rheology, Chalmers Univ. of Technology, Gothenburg, Sweden, Aug. 23-27, 1976, C. Klason and J. Kubat, Edts., pp. 172-173.*

*Primary Examiner*—Philip Anderson
*Attorney, Agent, or Firm*—Cushman, Darby & Cushman

[57] ABSTRACT

A very low density material is produced by extruding a composition comprising a settable fluid containing long resilient fibres through a narrow die under conditions which cause the extrudate to expand to form an open fibrous structure as it leaves the die, and then causing the fluid to set. This is applicable to both thermoplastic and thermosetting materials. Various coating layers may be applied to provide rigid light-weight panels and shaped articles for various uses including furniture and building applications.

16 Claims, 4 Drawing Figures

FIBRE EXPANDED REINFORCED MATERIALS AND THEIR PROCESS OF MANUFACTURE

The invention relates to the production of a low density material.

According to the invention a method of producing a low density material comprises extruding a composition comprising a settable fluid containing resilient fibres through a die under conditions which cause the extrudate to expand to form an open fibrous structure as it leaves the die, and then causing or allowing the fluid to set.

We have found that when long resilient fibres are randomly dispersed in a fluid and are then forced into a narrow die without first being aligned, they become distorted and their resilience will oppose the distortion. If the distorting stresses are maintained the fibres will tend to move within the fluid and to align themselves so as to reduce those stresses, but if the distorting stresses are removed before any substantial alignment can take place, the fibres will tend to revert back towards their original shape and orientation under their own resilience, provided they are not unduly impeded by the viscosity of the settable fluid. The extrudate emerging from the die when extrusion is carried out under such conditions, has a diameter considerably greater than that of the die bore, typically by a factor of between 5 and 10. However lower degrees of expansion, e.g. expansion by a factor of 2, does represent a significant expansion, and indeed for some applications the slightly higher density thus obtained may even be preferred. The appearance of the extrudate emerging from a circular-bored die under such conditions for high expansion is of a cylindrical mass of randomly oriented fibres, curled and tangled together in a loosely packed manner. Some of the surface fibres may be oriented longitudinally along the surface, but these are generally few in number or even non-existent under conditions of maximum expansion. Apart from this possibility of a few surface fibres, the general visual impression is one of complete lack of orientation in extrudates formed under optimised conditions as described herein.

The settable fluid may be any such material which has a viscosity under the extrusion conditions sufficiently low to permit the movement of the fibres and yet which is sufficiently high to carry the fibres through the die. Thus a too-low viscosity liquid will merely filter through the fibres which will be left bridging the die opening, but the limiting lower value varies with the type of fluid used. Thus for example, as a generality (which may not be exclusive), fluids comprising long chain molecules may be more effective in carrying the fibres through the die, than otherwise-similar fluids comprising shorter chain, e.g. more highly branched molecules. Thus when using fluids of long chain molecules, a lower viscosity may be more effective than when using only molecules with shorter chains. At the upper end of the scale, as the viscosity is increased resistance to movement of the fibres increases, and the upper limit to the viscosity depends partly on the resilient strength of the fibres and partly on the rate at which the fluid sets after extrusion. To obtain a high degree of expansion, it is generally preferred to use a low viscosity fluid conducive with its being capable of carrying the fibres through the die.

By "settable" we mean that the fluid may be "set" into such a form that it holds the fibres in the random orientation which occurs on extrusion. Thus for example the settable fluid may be a molten thermoplastic material which is extruded in its molten state and then set by cooling until it freezes. Examples of such material include the thermoplastic polymeric materials, such as for example polyolefins, polyamides, polyvinyl or vinylidene compositions, acrylic polymers such as polymethyl methacrylate, and thermoplastic polyesters. Thermosetting materials, such as epoxy or polyester resins may also be used as alternative fluids. Although care is required when such materials are activated before extrusion, to avoid setting of the materials in the extrusion apparatus, they do have the advantage that by not requiring bulky heating equipment they may be extruded through a die at the end of a probe for filling deep cavities. We have also obtained this fibre-induced expansion effect with fibre-filled slurries using mixtures of ceramic and starch. When the mixture is a paste, the expanded material may be sufficiently form-stable, i.e. set, without any further hardening operation being necessary. Ceramic pastes, however, may usefully be subsequently hardened by firing. It will be appreciated, therefore, that the scope in the selection of the settable fluid is very wide and enables the most suitable class of material for any given application to be used, provided the viscosity considerations described above, are met.

To optimise the result, a number of further parameters must be balanced and the selection depends mainly on which features are predetermined. Thus the factors which control the expansion forces are the resilience of the fibre material, the length and diameter of the fibres, and the diameter of the die bore. Given one or more of these, the others must be balanced accordingly in order to provide sufficient expansion forces to overcome the resistance due to the viscosity of the fluid as it leaves the die. As described above, however, delay in releasing the stresses on the distorted fibres once the stresses have been applied, may allow movement of the fibres within the fluid to relieve the stresses, resulting in lower expansion. To minimise this, the preferred die is one having substantally zero land length, i.e. wherein the die opening is defined by knife edges. Likewise, if the flow rate through the die is allowed to fall below a minimum value, the degree of expansion will fall. Throughput rates above the minimum value do not significantly increase the degree of expansion above that obtainable at that minimum value. This minimum value is dependent on the other parameters, but for any particular set of conditions, it is readily determinable experimentally by increasing the throughput rate until a further increase gives no significant increase in extrudate diameter.

Fibre-expanded thermoplastic material may be welded to further pieces of the material when forming shaped articles. The expanded material readily accepts screws and nails, and provided excessively small screws or nails are not used with the more highly expanded materials, screws and nails may be strongly held by the material. For many applications a broader extrudate than the 10-15 mm diameter is required, and a plurality of small dies may be used together, either in line for producing sheet or as an array of dies, the dies being arranged so that extrudate from adjacent dies merge together. In this way the die size may be optimised with respect to the expansion. The die may also be a slot but this is less effective than a substantially circular hole or series of substantially circular holes.

By reason of its low density, the extrudate may be used to confer rigidity to an article without excessively increasing the weight of the article. For example, cavities in previously moulded articles may be filled with the expanded material. Although having considerable compression strength when suitable settable fluids are used, when sufficient load is applied the expanded material crushes progressively with some resilience and some rupture. This property may be employed for example in a mounting for a car bumper, the mounting being in the form of a piston applied against the new material.

Providing the rate of setting of the fluid is not too rapid, with most fluids various shapes may be built up by extruding into contact with previously extruded material. Thus when the material is extruded into a cavity, the cavity may become filled with a coherent open-structured mass. Likewise, the material may be extruded onto a former so as to build up a desired shape. In this manner curved surfaces may be covered to form pipes or shells for safety helmets, for example. Because of the insulating properties of the material it may be desirable in some applications to provide means for controlling the temperature of the material as the shape is built up, especially when extruding thermoplastic material at elevated temperatures. In particular it is desirable to prevent the circulation of air through a hot block of material if the settable fluid degrades in contact with air. In such cases the temperature may be controlled by circulating an inert gas through the hot material. Of particular interest is the formation of flat sheet in this manner, and this may be achieved, for example, by repeatedly traversing a moving belt by one or more dies, by extruding onto the belt through a row of dies located across the belt, or by winding onto a bobbin having a narrow core and large diameter sides, or simply by extruding from a plurality of dies onto a moving belt for forming a continuous sheet. It is generally preferable to lightly press adjacent extrudates together to ensure a good bond.

The outer surface of the fibre-expanded extrudate, whether as freshly extruded or built up to form a shaped article such as a flat sheet, has an open fibrous structure which is not a suitable surface configuration for many applications, but which does provide a very good physical key for an applied surface finish. Such surface finishes may be applied in a variety of ways dependent on the effect desired and in some cases on the settable fluid used. Thus for example, laminates may be formed:

(a) By extruding onto one or both sides of the fibre-expanded material, a sheet of material which is not expanded in this manner. Thus for example, a sheet of unfilled polypropylene may be extruded onto either side of a sheet of fibre-expanded polypropylene coextruded from a row of orifices, (b) By pressing onto the surface of the fibre-expanded material, a preformed sheet of thermoplastic material, using heat to effect adhesion, (c) by sucking onto the expanded material a thermoplastic sheet softened by heat (because of its porosity the suction may be applied through the expanded material), (d) by fusing into the surface of the fibre-expanded material, thermoplastic material of lower melting point, and cooling to harden the fused material, (e) bonding to the surface a layer of particulate material, particularly inorganic materials such as sand or aggregate, using a suitable adhesive material (by which we include materials which will hold the particles by partial enclosure without any definite bond between the particulate material and the adhesive, such as the thermoplastic material of (c) above), (f) adhering to the surface of a preformed decorative or functional sheet, using a suitable adhesive, (g) applying a layer of other settable fluid such as for example cement, concrete or plaster slurries, bitumen or polyester gel coat.

The surface of the fibre-expanded material may be machined to a desired shape or thermoplastics may be flattened between heated spaced-apart rollers, e.g. prior to application of any of the above surface finishes, but in most cases this will not be found necessary and indeed the heated rollers may result in an undesirable loss of physical keying ability.

Shapes other than flat sheets may be produced either by extruding onto a suitably shaped former, or in the case of a thermoplastic material, by shaping a heated preformed flat sheet. The surfaces of the shaped articles may be treated in any of the ways described above for flat sheet, and where the shaped article is thermoformed from flat sheet, the coating or surface layer may be applied before shaping provided it also is suitably thermoformable. However, because of the heat-insulating properties of the fibre-expanded material, reheating the material once it has cooled, takes a considerable time, and it is therefore preferred to mould the sheet while it is still sufficiently soft from the extrusion process rather than allowing it to cool and having to subsequently reheat it.

The material is particularly useful where rigidity and/or thermal insulation is desired, and may be used for cavity filling in buildings or for the insulation of single leaf walls. Thus panels formed from the material may be used for external or internal insulation. For example, by facing one surface with a weather resistant finish, panels may be used for roofs or wall cladding for the outside of buildings. Panels for insulating internal walling need not be weather resistant. Decorative or decoration-receptive surfaces may be applied. It is, however, preferable to provide a coating on both surfaces to produce a balanced laminate, since this tends to be more stable, e.g. to changes in temperature. Shaped sheets may be used e.g. as a semi-circular sectioned protection for underground drainage pipes; or by winding the material onto a suitable cylindrical mandrel, porous pipes themselves may be produced. Chairs and other furniture may be produced in the low density material.

DETAILED DESCRIPTION OF THE DRAWINGS

Figure 1:
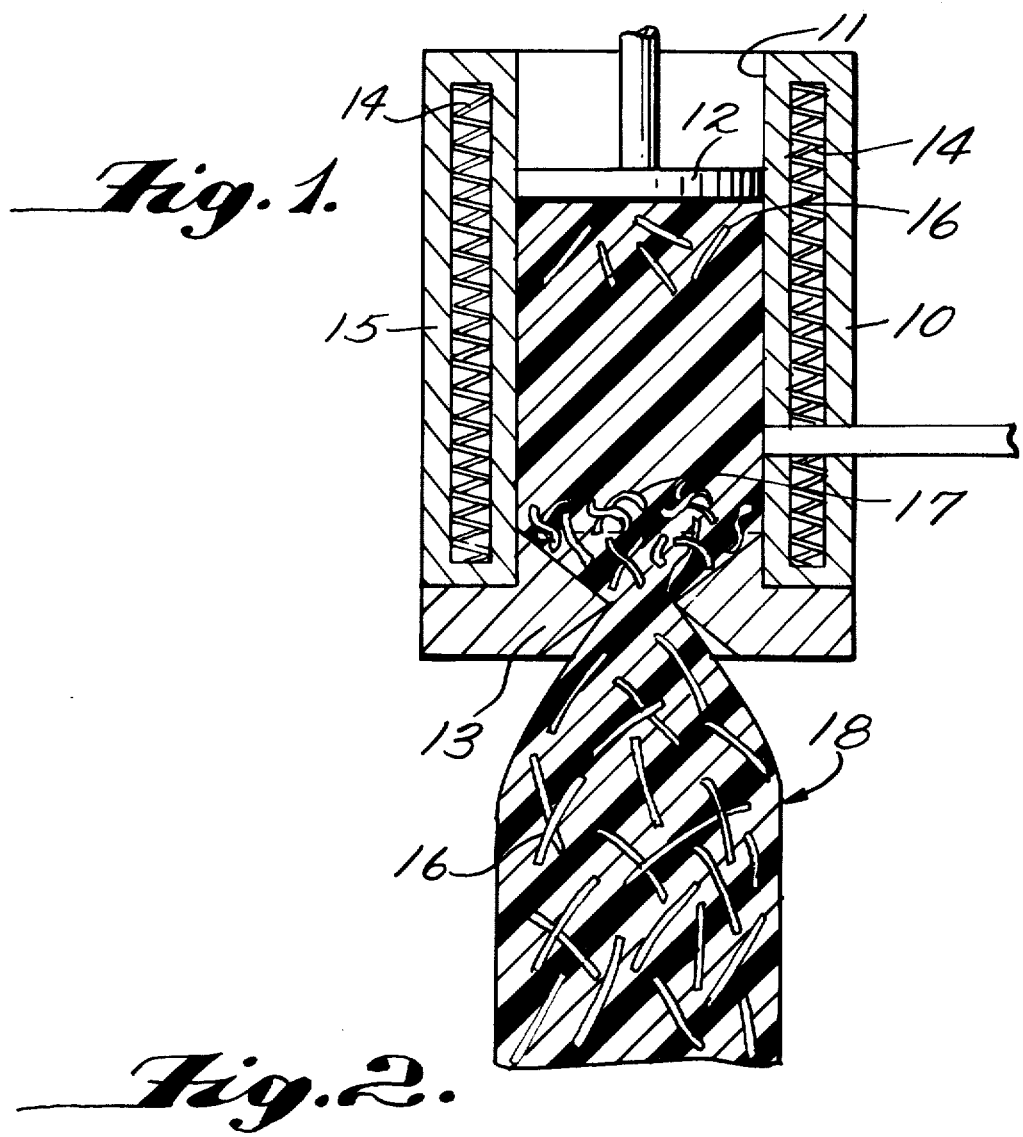
FIG. 1 depicts the apparatus used to undertake the method of the invention.
Figure 2:
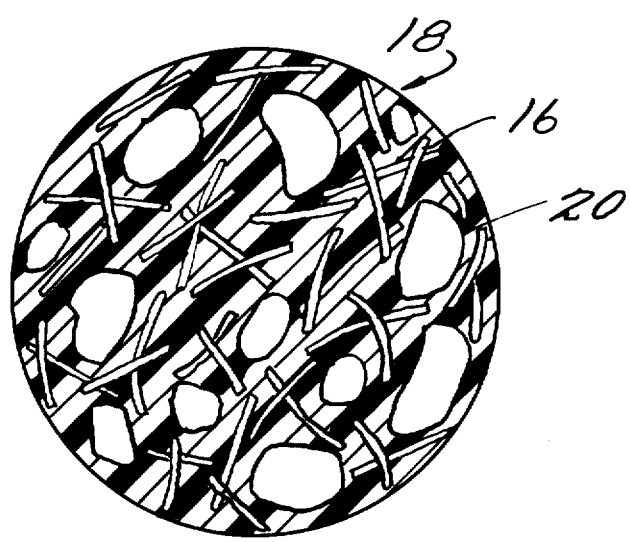
FIG. 2 illustrates the extrudate produced in accordance with the invention.

The apparatus used is shown in FIG. 1. In FIG. 1 a ram extruder denoted generally by 10 consists of a barrel 11 and a piston 12 slidable therein. The extruder is positioned for extrusion in a vertically downward direction and is provided with a detachable die 13. In the apparatus shown the die 13 has zero die length. In operation the settable material to be extruded, in this case glass-filled polypropylene, is charged to the barrel by removing the piston. Heating is applied by means of heaters 14 in a jacket 15 surrounding the barrel 11 until the polypropylene is molten. The piston 12 is then advanced to force the mixture of polypropylene and randomly dispersed glass fibres 16 (shown much enlarged) through the die 13. As the mixture approaches the die the glass fibres become distorted in shape as indicated by 17. On passing through the die the restraining forces on the fibres are removed and the fibres immediately tend to revert to their original shape and orientation under their own resilience. This relaxation of stress results in the extrudate 18 expanding to a diameter considerably greater than the die bore to provide a low density extrudate 1 consisting of a mass of randomly oriented fibres 16 in an open expanded polypropylene matrix 20. The extrudate 18 is more clearly illustrated in section in FIG. 2. For the purpose of measuring the pressure developed in the barrel a transducer 21 is provided passing through jacket 15 to the wall of barrel 11.

Figure 3:
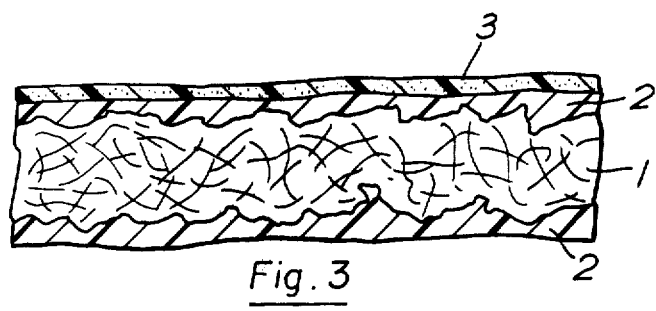
FIG. 3 is a diagrammatic section of an article of manufacture produced in accordance with the invention.

FIG. 3 of the drawings is a diagrammatic section of a portion of such a panel, wherein the fibre-expanded polypropylene 1 has on both sides a layer 2 of EVA copolymer. One of these has a further coating 3 of a sand/EVA copolymer mixture which forms a good bond onto the preformed EVA copolymer layer. Laminates formed using other single or double coatings have a similar appearance to that shown, except that less viscous coatings may follow the surface undulations more closely unless these are smoothed in some way.

Figure 4:
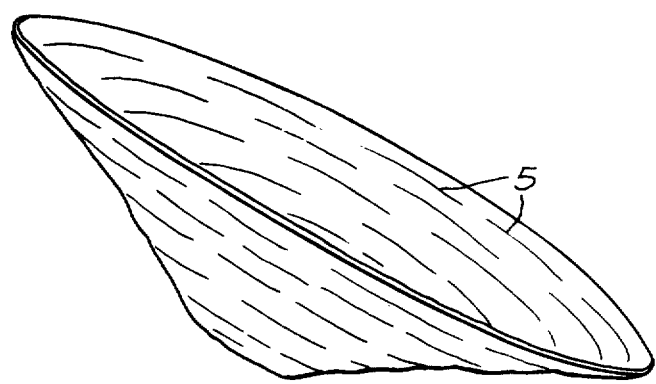
FIG. 4 is a diagrammatic sketch of a chair shell.

The chair shell so produced is sketched in FIG. 4. The manner of lay-up could be easily seen from the surface texture, this general impression being represented by the lines 5.

The following experimental results are provided by way of example to show the manner and degree by which variation of the main parameters affects the results extrudate, and to show how the material may be utilised to produce useful articles.

EXAMPLES 1-19

In these examples, the extruder used was a ram extruder arranged to extrude vertically downwards and having a reservoir 22 mm in diameter. The extrusion parameters which were variable in this apparatus were the volume flow rate Q, the melt temperature T within the barrel, the extrusion pressure P, the die length 1 and the die diameter d. Where the apparatus was set for constant volume flow rate the extrusion pressure varied greatly, but the value quoted below is the time average value, the pressure fluctuation being about ±30% at the low flow rates reducing to about ±10% at the high flow rates.

The composition used for these examples was a glass filled polypropylene having a density of about 1080 kg $m^{-3}$ in the solid state and contained about 30% by weight of glass. The polypropylene had a melt flow index (190° C./10 kg, ASTM D1238)=40.0. The composition had been previously blended by impregnating glass roving with molten polypropylene, and the impregnated roving chopped to the length f required for the fibres. The diameter of the individual fibres was 10 μm, although by the method of manufacture of the glass fibres the effective fibre unit may be bundles of up to one hundred such individual fibres.

The results of these experiments are shown in Table I.

TABLE I

| Ex. | f mm | d mm | l mm | Q $m^3s^{-1}$ × $10^{-6}$ | T °C. | P bar | Extrudate density kg $m^{-3}$ | Extrudate diameter mm |
|---|---|---|---|---|---|---|---|---|
| 1 | 11 | 2 | 32 | 0.4 | 210 | 145 | 390 | 3.2 |
| 2 | 11 | 2 | 0 | 0.4 | 210 | 95 | 100 | 14 |
| 3 | 11 | 2 | 0 | 0.4 | 180 | 150 | 460 | 8 |
| 4 | 11 | 2 | 0 | 0.4 | 190 | 120 | 280 | 10 |
| 5 | 11 | 2 | 0 | 0.4 | 200 | 100 | 140 | 12 |
| 6 | 11 | 2 | 0 | 0.4 | 210 | 95 | 100,160 | 14 |
| 7 | 11 | 2 | 0 | 0.4 | 230 | 85 | 100 | 14 |
| 8 | 11 | 1 | 0 | 0.4 | 230 | ~150 | 100 | 8 |
| 9 | 11 | 1 | 0 | 0.4 | 250 | ~150 | 100 | 10 |
| 10 | 11 | 2 | 0 | 0.04 | 210 | 15 | 220 | 8 |
| 11 | 11 | 2 | 0 | 0.08 | 210 | 26 | 210 | 9 |
| 12 | 11 | 2 | 0 | 0.20 | 210 | 57 | 240 | 10 |
| 13 | 11 | 2 | 0 | 0.40 | 210 | 95 | 160,100 | 14 |
| 14 | 11 | 2 | 0 | 0.80 | 210 | 140 | 120 | 15 |
| 15 | 11 | 2 | 0 | 1.20 | 210 | 170 | 100 | 14 |
| 16 | 50 | 2 | 0 | 0.04 | 230 | 155 | ~200 | ~15 |
| 17 | 20 | 2 | 0 | 0.4 | 230 | 105 | 120 | 15 |
| 18 | 11 | 2 | 0 | 0.4 | 230 | 85 | 100 | 14 |
| 19 | 5 | 2 | 0 | 0.4 | 230 | 20 | 180 | 6 |

Examples 1 and 2 show the effect of die length, and since the zero length die was so superior to the other, that die was used throughout the following experiments. In Examples 3 to 7, the melt temperature T was varied, showing how the fibres were freer to expand the composition to a lower density as the viscosity of the melt was lowered, the optimum extrusion temperature being about 210. In Examples 8 and 9 a smaller diameter bore was used, and while this gave as low a density extrudate as before, the extrusion pressure increased. Hence for most applications the 2 mm diameter bore would be preferable with this material.

Examples 10 to 15 show how the change in volume flow rate affects the density of the extrudate, and in addition the higher flow rates gave less fluctuation in pressure. Clearly the slower flow rates are to be avoided, but beyond about $0.4 \times 10^{-6} m^3 s^{-1}$, very little improvement was observed.

For most parameters the improvement reaches a maximum with little or no further advantage beyond that point. With the fibre length, however, there is a definite optimum length. Thus with 10 μm diameter glass and 2 mm diameter die the fibre length is preferably within the range 8-20 mm, the optimum being about 11 mm. This is illustrated by the results of Examples 16 to 19.

EXAMPLES 20-22

In these examples the extruder used was the same as that used in the previous examples, but the compositions were varied. In Example 20, polypropylene was mixed with 11 mm glass fibres instead of using impregnated roving as previously. In the table below, Example 7 is requoted for reference, and it will be seen that although the required pressure was slightly higher, the two extrudates were almost identical in density and diameter. The appearances of the two extrudates were also very similar. In Examples 21 and 22, nylon was used in place of polypropylene, the rovings being initially impregnated with the nylon and then chopped to length before the nylon was remelted in the extruder. The nylon used was a moulding grade of type 66. The quantity of glass was again about 30% by weight and 10 μm in diameter. Open structured extrudates having very low densities similar to those using polypropylene, were obtained.

The experimental results obtained are shown in Table II.

TABLE II

| Example | Feedstock | d mm | l mm | Q m³s⁻¹ ×10⁻⁶ | T °C. | P bar | Extrudate density kg m⁻³ | Extrudate diameter mm |
|---|---|---|---|---|---|---|---|---|
| 7 | polypropylene 11 mm glass fibres pre-impregnated | 2 | 0 | 0.4 | 230 | 85 | 100 | 14 |
| 20 | polypropylene 11 mm glass fibre mixture | 2 | 0 | 0.4 | 230 | ~150 | 100 | 15 |
| 21 | 11 mm glass fibre + nylon | 1 | 0 | 0.4 | 285 | ~200 | 100 | 10 |
| 22 | 11 mm glass fibre + nylon | 2 | 0 | 0.4 | 275 | 200 | 140 | 12 |

EXAMPLE 23

In order to study the dependence of the fibre-induced expansion on the viscosity of the settable fluid, a number of experiments were carried out using fluids whose viscosities covered a wide range. The viscosity was measured at a shear rate of 100 s⁻¹, this shear rate being selected as an approximation to the conditions generally experienced by a thermoplastic melt forced through an extruder die. In each case the viscosity was measured in a capillary viscometer using dies having a length:diameter ratio of 16:1.

The compositions all contained about 10% by volume of glass fibre (which for polypropylene as the settable fluid is approximately the same as that used in Examples 1-19), and the degree of fibre-induced expansion was measured using a ram extruder with a die having a 2 mm diameter bore. In the following table of results, "slight" means a diametric expansion on leaving the die of 1.2-1.5, "moderate" means an expansion of 1.5-4, and "good" means an expansion greater than 4. The melt flow index quoted for polypropylene was measured according to ASTM D 1238, the more viscous being a typical extrusion grade and the less viscous a typical moulding grade.

The results obtained are given in Table III.

TABLE III

| Material | Temperature °C. | Viscosity at 100 s⁻¹ (Ns/m²) | Expansion |
|---|---|---|---|
| Pitch of low softening point | 40° C. | 100 × 10² | Slight |
| Rigid PVC | 200° C. | 100 × 10² | Slight |
| Pitch of low softening point | 50° C. | 20 × 10² | Moderate |
| Polypropylene (MFI 190° C./10 kg = 0.8) | 230° C. | 15 × 10² | Moderate |
| Plasticised PVC | 200° C. | 10 × 10² | Moderate |
| Polypropylene (MFI 190° C./10 kg = 25.0) | 230° C. | 3 × 10² | Good |
| Nylon 66 | 285° C. | 1 × 10² | Good |
| Epoxy resin | 20° C. | 0.1 × 10² | Does not carry fibres |
| Solution of rubber in volatile solvent | 20° C. | 0.1 × 10² | Does not carry fibres |

We also tried using polypropylene fibres (as a softer fibre) with the epoxy resin, but the resin failed to carry these fibres also.

EXAMPLE 24

A flat sheet of the open structured material was formed by extruding strips of glass fibre-expanded polypropylene in such a manner that each fresh strip was laid in contact with the previously extruded strip. This was carried out on a flat surface, and the resultant sheet had a thickness of approximately 10 mm.

A stiff board was formed by placing the polypropylene extrudate between two sheets of unfilled polypropylene, each 0.9 mm thick, heating the sheets to 200°-210° C. and applying light pressure to weld the open structured material to the sheets. After cooling the sandwich had an overall thickness of 5.74 mm. The flexural modulus was about 0.77 GN m⁻² and the core density was about 305 kg m⁻³.

EXAMPLE 25

In this and subsequent Examples 26 to 34, a 38 mm diameter screw extruder was used in place of the ram extruder of the previous experiments, the extruder being arranged to extrude horizontally. The extruder was a low capacity experimental extruder, so that the residence time of the material in the extruder was correspondingly low, and the degree of expansion was less than was obtained using the ram extruder of the previous examples, even though the temperature was maintained generally slightly higher at 250° C. If the screw were stopped for 5 to 10 minutes, it was found that on restarting the extrusion, the composition which had been retained in the extruder for that period provided a degree of fibre-induced expansion comparable with that obtained using the ram extruder wherein similarly longer residence times occurred. The die had three substantially zero-length bores spaced 1 cm apart and arranged in a horizontal line across the die face. The composition was the same as that used in Examples 1-19.

In this experiment a thicker sheet than that of the previous example was produced, using a bobbin former mounted so as to be free to rotate about a horizontal axis. The former had a core diameter of 10 cm, with sides 3 cm apart and 1 m diameter. The composition was extruded through the die, expanding as the fibres straightened on emerging from the die, and the extrudate was wound onto the bobbin. Gentle pressure was applied by hand to the material on the bobbin as it filled up, to ensure good contact between successive layers. When the bobbin was full, one side was removed and the extrudate extracted. The resulting article was a circular sheet of thickness 3 cm and density about 200 kg m$^{-3}$.

EXAMPLE 26

A portion of a circular sheet produced as in the previous example was coated with powdered ethylene vinyl acetate copolymer (EVA) which was then fused in a hot air oven at 120° C. The fused powder gave a smooth surface, penetrating the outer layers of expanded material and thereby obtaining a very strong physical key.

EXAMPLE 27

This example was a repeat of the previous example except that in place of the EVA copolymer alone, a mixture of equal parts by volume of EVA copolymer and sand was used. The result was a lightweight rigid core, with a weather resistant coating also having good penetration resistance. The 3 cm thick open structure of the panel provides stiffness and thermal insulation, and such a panel is suitable for roofing purposes or wall cladding.

However, on sawing the material to provide a section, it was clear that the mechanical key obtained with sand-filled EVA copolymer, was not as good as that obtained with the EVA copolymer alone. We therefore prefer to first apply a layer of unfilled copolymer, fuse the copolymer and remove it from the oven, and then apply the sand/EVA copolymer mixture to the EVA copolymer layer, and return to the oven for fusing this outer layer. Whether forming a single coat or a double coat in this manner, a smooth surface was obtained in each case by simply smoothing the surface of the powder before the powder-covered core was placed in the oven.

As with all of these laminates, it is preferred to apply a balancing layer on the other side of the core. The two layers are preferably identical, but this is not essential, and, for example a layer of EVA copolymer alone may be provided on the reverse of the sand/EVA copolymer side where cladding panels are being produced.

EXAMPLE 28

As a variation on Example 27, a portion of a similar sheet was coated with polyethylene powder and placed on a sand tray in an oven at 170° C. The resultant panel had a similar appearance to that of the previous example, again having a light weight core with a good penetration and weather resistant surface.

Pebble-dash effects have been similarly produced using coarser particle sizes, polyethylene powder again being used to bind the particles to the core.

EXAMPLE 29

A further piece of a 3 cm thick sheet of fibre-expanded polypropylene was coated with a layer of concrete about 1 cm thick, which was then left to set. This was found to key strongly to the expanded polypropylene, and effectively spread loads applied to the surface. Thus whereas the weight of a man applied over the area of one shoe was about the loading at which the core started to show signs of rupture, when coated with the concrete layer no adverse affects were noticeable even under considerably greater loading. Thus the expanded material may suitably be used to provide thermal insulation below a rigid floor supported on it.

EXAMPLE 30

Onto a further portion of a 3 cm thick sheet of fibre-expanded polypropylene, were placed lumps of a pre-blended composition comprising 20 wt % EVA copolymer and 80 wt % bitumen. The sheet and lumps of the blended composition were placed into an air oven at 120° C. to soften the lumps which were then spread over the surface of the fibre-expanded sheet. The coated sheet was left in the oven for the softened composition to flow into the interstices of the sheet surface. After removal from the oven and being left to cool, the EVA/bitumen layer was found to have keyed well to the open fibrous structure, and to be firmly held. The surface contours resembled the contours of the underlying sheet.

EVA/bitumen blends may also be applied by curtain coating, and a more even surface can be obtained by first machining the surface of the expanded core. This does not noticeably affect the ability of the blend to key to the substrate. EVA/bitumen blends are also particularly suitable for water-proofing one surface, when the other surface is provided with a structural surface layer (e.g. concrete) or decorative layer (e.g. PVC floor composition or pebbledash for cladding panels).

Filled EVA/bitmen blends can be similarly used provided the filler size is not sufficient to prevent the blend obtaining a good key to the substrate. Flatter surfaces may be obtainable with suitably filled blends. Filled blends in the form of membranes used for roofing purposes may also be applied, adhered to the fibre-expanded panel, for example, by a layer of the unfilled blend.

EXAMPLE 31

Onto both sides of a further portion of the 3 cm thick fibre-expanded material of Example 25, was smoothed a thin layer of plaster/water mixture which was allowed to dry. The result was a laminate suitable for forming internal partition walling, and having securely keyed to the core a traditional plaster finish capable of being decorated by traditional methods.

EXAMPLE 32

In order to demonstrate the thermoformability of the expanded material, a further portion of a 3 cm thick sheet similar to that of Example 25 was prepared and while still soft from the extrusion process was bent around a 10 cm diameter pipe into an arch shape and there allowed to cool and harden. The material retained the arch shape on removal from the mould, and there appeared to be no detrimental effect on the fibre-expanded structure. Such a simple, easily formed shape may be used for protecting underground drainage pipes or electricity cables from damage while they are being buried.

The expanded sheet was shaped while it still retained heat from the extrusion, because reheating an already cooled sheet was found to take a very considerable time due to the good heat-insulative properties of the material. However, when a sheet was reheated, even one having an unfilled skin of the same material attached on both surfaces, successful forming of similar shapes could be obtained.

EXAMPLE 33

This experiment is provided as an example of how shapes other than flat sheets may be built up during extrusions, instead of being shaped from a flat sheet as in the previous example. The article produced was a simple chair shell, and this was built up on a frusto conical former whose apex angle was about 120°. The former was mounted on a turntable with its base against the turntable surface and its apex directed away from the turntable but lying on the axis of rotation. The diameter of the base of the cone was about 90 cm and its height about 60 cm.

Starting from the apex, fibre-expanded extrudate from the extruder used in Example 25 was wound by hand around the conical former while the turntable was rotated. Each successive strip was pressed lightly into contact with that already on the former so as to ensure good contact between them. Extrusion was continued until the whole surface of the former was covered, a further layer being applied around the base for added strength. Further reinforcement was added around the apex where the shell was to be attached to the chair legs.

On removal from the former after the polypropylene had cooled sufficiently to set, the resultant shape was light, strong, and showed no tendency to tear apart between adjacent strips.

Other chair shells have been made in a similar manner using existing chairs as moulds. Thus for example, a typists chair moulded from polypropylene was used as a mould around which to form a chair from fibre-expanded polypropylene.

EXAMPLE 34

On a piece of one of the chairs of Example 33 was spread a layer of thermoplastic powder containing a foaming agent activatable at or below 200° C. The layer of powder was smoothed off and the coated panel placed in an oven at 200° C. to fuse the thermoplastic powder and activate the foaming agent. After cooling, the powder was found to have formed a soft resilient coating on the fibre-expanded substrate, the coating having a good mechnical key to the substrate.

EXAMPLE 35

Epoxy resin and hardener (as sold in "Do it yourself" stores in twin packs under the name "Araldite") was mixed with 10 mm long glass fibre in the weight/weight proportions 75:25. The mixture was placed in the 10 mm diameter reservoir of a ram extruder and pressure applied to cause it to extrude through a 2 mm diameter orifice. At first the resin, having too low a viscosity to carry the glass fibres with it, filtered through the glass fibre. A second batch of the mixture was left for three hours so that it partially set—the viscosity of the resin increasing through the action of the hardener. This second sample was then extruded at a volume flow rate of $0.1 \times 10^{-6}$ m$^3$/second under an extrusion pressure of about 140 atmospheres to give a fibre-expanded extrudate which visibly expanded further over a period of 10–15 minutes to a final density when the resin had fully hardened of about 200 kg/m$^3$.

EXAMPLE 36

A paste composed of 375 grams of α-alumina, 75 gms "Kordek" (starch), 25 gms of "Bentonite" (clay) and 155 ml of water was compounded with 35 g of 1" long glass fibre of 10 μm diameter. This mixture was charged to the 22 mm diameter barrel of a ram extruder and extruded at 20° C. through a 2 mm diameter orifice at volume flow rates of up to $1 \times 10^{-6}$ m$^3$/s. The pressure required to maintain the extrusion was about 150 atmospheres. The extrudate was expanded by the fibres to give a diameter of about 8 mm. These extrudates were subsequently fired at 850° C. to give a rigid structure with a density of about 350 kg/m$^3$.

EXAMPLE 37

In order to demonstrate how the fibre-expanded material may be used to strengthen an article, a bowl was vacuum formed so as to incorporate the material. The mould was designed to provide a simple frusto-conical bowl with its broader end open and a base closing its narrower end. A sheet of fibre-expanded material as formed in Example 25, was placed on the base of the mould. A sheet of polyvinyl chloride heated sufficiently to soften it (the temperature being about 150° C.) was suspended across the mouth of the mould. Vacuum was then applied to the mould through the fibre-expanded material until the polyvinyl chloride was pulled down onto the fibre-expanded material, with the remainder conforming to the sides of the mould. On subsequent cooling, the fibre expanded material was found to be secured against the base of the bowl, providing the latter with rigidity.

EXAMPLE 38

A sheet of fibre-expanded polypropylene was formed in the manner described in Example 25, and a piece cut from the sheet. Sheets of PVC were heated until soft, pressed one onto each face of the piece of fibre-expanded sheet, and then cooled. This secured the PVC sheet to the expanded material by a strong mechanical key therebetween. The thickness of the laminate thus produced was 2.7 cm, being made up of an expanded core of about 2 cm in thickness, bounded by the PVC sheets of about 0.35 cm thickness each.

The laminate was held vertical, and a fierce flame from a glass-blower's gas burner was directed onto a small area of surface of the laminate. After 10 minutes the flame was removed and all burning stopped immediately. The area directly impinged by the flame was found to be badly charred, the diamter of the charred area being about 10 cm, and immediately above that area was also charred. The remainder of that surface was found to be substantially unmarked by the flame. The other surface, i.e. on the side away from the flame, was found to only have a slight deformation directly behind the heated area.

EXAMPLE 39

A laminate was made, similar to that of Example 38, but differing in the manner of securing the PVC sheet to the fibre-expanded core. In this example a melt adhesive was used, being one melting at less than 100° C. A considerable improvement in the quality of the laminate surface was obtained.

EXAMPLE 40

A further portion was cut from the sheet of fibre-expanded polypropylene prepared as described in Example 38. Onto the surface of the portion was spread a layer of PVC powder containing a blowing agent, and the expanded material together with its powder load was placed in a hot air oven at 190° C. for 10 minutes. This temperature was sufficient to fuse the powder and to activate the blowing agent. Onto the powder was placed a chrome-faced glazing plate and at the end of the 10 minutes, the material was allowed to cool with the glazing plate in situ. When the PVC had solidified the plate was removed to reveal a soft spongy foam adhering firmly onto the face of the expanded material, the surface of the foam coating being smooth.

EXAMPLE 41

The glazing plate of the previous example also had a brass surface backing the chrome surface. The experiment of Example 40 was repeated with the brass surface against the PVC. On cooling the glazing plate adhered very strongly to PVC foam, which thus acted as a melt adhesive between the fibre-expanded substrate and the glazing plate.

We claim:

1. A method for producing a low density material comprising extruding a composition comprising a settable fluid containing resilient fibres through a die generally having a minimal land length so that relaxation of the fibres causes the extrudate to expand to form an open fibrous structure as it leaves the die, wherein the settable fluid used when resinous is selected from those having a melt viscosity of between 10 Ns/m$^2$ and 10,000 Ns/m$^2$ measured at a shear rate of 100 reciprocal seconds and the ratio of average length of the fibres to the diameter of the die is at least 2.5 to 1, and then causing or allowing the fluid to set.

2. A method according to claim 1 in which the die comprises a substantially circular hole and has substantially zero land length.

3. A method according to claim 1 in which a plurality of dies are used together, being arranged so that extrudates from adjacent dies merge together after leaving the dies.

4. A method according to claim 3 in which the settable fluid is extruded onto a moving former so as to build up the material on the former into a desired shape.

5. A method according to claim 1 in which the settable material comprises a polymeric material selected from the group consisting of thermoplastic and activatable thermosetting polymers.

6. A method for producing a low density material comprising extruding a composition according to the method of claim 1, forming a fibre expanded article of desired shape from the extrudate and adhering to at least part of the surface of the fibre expanded material a surface layer of a material having physical properties different from those of the fibre expanded article.

7. A method according to claim 6 in which said surface layer of material is applied in sheet form and adhered to at least part of the surface of the fibre expanded article.

8. A method according to claim 6 in which said surface layer of material comprises a particulate material.

9. A method according to claim 8 in which the particulate material is applied to the fibre expanded material in an adhesive or binder material which binds the particulate material together in the layer and bonds the layer to the fibre expanded material.

10. A method according to claim 8 in which the particulate material is a particulate thermoplastic material containing a blowing agent and is fused onto the surface of the fibre expanded material and is subsequently expanded into a foamed structure.

11. A method according to claim 6 in which said surface layer is of a settable material selected from the group consisting of cement, plaster and concrete slurries, bitumen and polyester gel coat and is applied to the surface of the fibre expanded material and is caused or allowed to set.

12. A low density structure comprising a fibre expanded material in the form of a shaped article produced according to the method of claim 1.

13. A composite low density structure comprising a fibre expanded material and bonded surface layer in the form of a shaped article produced according to the method of claim 6.

14. A composite low density structure comprising a fibre expanded material and a bonded surface sheet in the form of a shaped article produced according to the method of claim 7.

15. A composite low density structure comprising a fibre expanded material and a bonded surface sheet in the form of a shaped article produced according to the method of claim 8.

16. A low density structure according to claim 13 in which the material of the bonded layer is selected from the group consisting of cement, plaster, concrete, bitumen and polyester gel coat.

* * * * *